US010484547B2

United States Patent
Weeks (10) Patent No.: US 10,484,547 B2
(45) Date of Patent: Nov. 19, 2019

(54) SYSTEMS AND METHODS OF DISTRIBUTING IMAGE EFFECTS FOR USER EXPERIENCES

(71) Applicant: DISNEY ENTERPRISES, INC., Burbank, CA (US)

(72) Inventor: Kristin Weeks, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 268 days.

(21) Appl. No.: 15/340,018

(22) Filed: Nov. 1, 2016

(65) Prior Publication Data
US 2018/0124261 A1    May 3, 2018

(51) Int. Cl.
*H04N 1/00*    (2006.01)
*H04N 5/232*    (2006.01)

(52) U.S. Cl.
CPC . *H04N 1/00244* (2013.01); *H04N 2201/0084* (2013.01); *H04N 2201/3252* (2013.01); *H04N 2201/3253* (2013.01); *H04N 2201/3263* (2013.01); *H04N 2201/3264* (2013.01); *H04N 2201/3266* (2013.01); *H04N 2201/3267* (2013.01)

(58) Field of Classification Search
CPC .... H04N 7/181; H04N 5/23251; H04N 7/185; H04N 5/23254; H04N 5/23258; H04N 5/23264; H04N 5/2327; H04N 2201/0012; G06K 9/46–9/527
USPC ...................... 348/207.11, 116, 14.02, 14.03
See application file for complete search history.

(56) References Cited

U.S. PATENT DOCUMENTS

| | | | |
|---|---|---|---|
| 9,691,000 B1* | 6/2017 | Karakotsios | H04N 5/23229 |
| 2012/0176503 A1* | 7/2012 | You | H04N 1/00411 |
| | | | 348/220.1 |
| 2015/0077434 A1* | 3/2015 | Fukuchi | G06F 3/011 |
| | | | 345/633 |
| 2015/0271396 A1* | 9/2015 | Lee | H04N 5/23229 |
| | | | 348/222.1 |

* cited by examiner

*Primary Examiner* — Xi Wang
(74) *Attorney, Agent, or Firm* — Esplin & Associates, PC (57) ABSTRACT

This disclosure relates to a system and method configured to distribute image effects for user experience events. In some implementation, a user experience event may include making one or more image effects available to one or more users via computing platform associated with the users. In some implementation, an image effect may include one or more of a filter, a sticker, an animation, a text, a video clip, a free form drawing, and/or other effects.

16 Claims, 4 Drawing Sheets

SYSTEMS AND METHODS OF DISTRIBUTING IMAGE EFFECTS FOR USER EXPERIENCES

FIELD

This disclosure relates to systems and methods configured to distribute image effects for user experience events.

BACKGROUND

The increase in popularity of image sharing applications has spawned a number of unique features to enhance user's image capture and sharing experience.

SUMMARY

This disclosure relates to systems and methods configured to distribute location and activity based image effects as part of user experience events. Such effects may enhance user interaction with some real world activity. For example, a retailer, a theme park, a festival, and/or other activities may be enhanced by providing users with image effects within a user experience event that has location and/or activity criteria that dovetail with one or more specific activities. In some implementation, a user experience event may include making one or more image effects available to users. The one or more image effects may be made available based on one or more of activity information, location information, and/or other information. In some implementation, an image effect may include one or more of a filter, a sticker, an animation, a text, a video clip, a free form drawing, and/or other audio and/or visual effects. The image effects can be used to edit user captured content. The user captured content may be captured from a computing platform. The user captured content may be one or more of an image, a video, a slideshow, and/or other user captured content.

A system that distributes image effects for user experience events may include one or more of one or more physical processors, non-transitory electronic storage, and/or components. The one or more physical processors may be configured by machine-readable instructions. Executing the machine-readable instructions may cause the one or more physical processors to facilitate the distribution of the one or more image effects for user experience events. The machine-readable instructions may include one or more computer program components. The computer program components may include one or more of a location component, an activity component, a determination component, a distribution component, a user component, an effectuation component and/or other computer program components.

The non-transitory electronic storage may be configured to store sets of user experience event information and/or other information. The sets of user experience information may define individual user experience events. The individual user experience events may include making one or more image effects and/or other effects available to users. The individual sets of user experience information may define criteria for making one or more image effects and/or other effects available to users, and/or other information. The criteria may be related to one or more of user activities to be performed, physical location to be visited, and/or other information. By way of non-limiting illustration, a set of user experience information of a user experience event may define first criteria, and/or other information. The first criteria may include one or more of a first activity criterion, a first location criterion, and/or other criterions.

The image component may be configured to obtain image information, and/or other information. The image information may define user captured content, and/or other information. User captured content may include one or more of an image, a video, a slideshow, and/or other user captured content. The user captured content may be obtained from one or more computing platforms and/or devices.

The location component may be configured to obtain location information and/or other information. The location information may indicate location of individual computing platforms and/or individual entities associated with individual computing platforms within one or more real-world environments. Location may include a single location and/or sets of locations over time. The individual entities associated with individual computing platforms may include individual users, groups of users, and/or other entities. A computing platform may include one or more sensors configured to obtain location information and/or other information.

By way of non-limiting example, the location component may be configured to obtain location information indicating location of a computing platform associated with a first user. The location information may be obtained from the computing platform associated with the first user.

The activity component may be configured to obtain activity information and/or other information. The activity information may convey one or more activities being performed by individual entities associated with individual computing platforms.

By way of non-limiting example, the activity component may be configured to obtain activity information conveying activities performed by the first user, and/or other users. The one or more activities performed by the first user may include including a first activity and/or other activities. The computing platform may include sensors configured to obtain activity information and/or other information. In a non-limiting example, the activities may be one or more of tasks performed, locations visited, items obtained, and/or other activities.

The determination component may be configured to determine whether criteria of one or more user experience events has been satisfied. The criteria of a user experience event may include one or more criterion. The determination may be based on one or more of location information, activity information, and/or other information. Criteria of one or more user experience events may be satisfied based on one or more of activity information, location information, and/or other information.

By way of non-limiting illustration, satisfaction of the first criteria may be determined based on satisfaction one or more of the first activity criterion, the first location criterion, and/or other criterion.

The distribution component may be configured to make one or more image effects available to one or more computing platforms. In some implementations, one or more image effects may be made available responsive to the criteria of the individual sets of user experience information being satisfied. By way of non-limiting illustration, responsive to the first activity criterion, the first location criterion, and/or other criterion included in the first criteria being satisfied, the first image effect may be made available to the first user via the computing platform.

In some implementations, the distribution component may make the image effects corresponding to the criteria available to the users. Responsive to the criteria of the individual sets of user experience information being satisfied, the distribution component may make the image effects available to the users. In some implementations, the distribution component may make the image effects corresponding to the criteria unavailable to the users. Responsive to the criteria of the individual sets of user experience information not being satisfied, the distribution component may make the image effects unavailable to the users.

The user component may be configured to obtain user inputs and/or information. User inputs may correspond to selection of one or more image effects made available to users, and/or other user inputs. User inputs may be one or more inputs related to location information, activity information, and/or other information. User inputs may be obtained from one or more computing platforms and/or other devices. User inputs may include one or more of an auditory command, a manipulation of a user interface element, and/or other types of user inputs.

The effectuation component may be configured to effectuate one or more image effects and/or other content. The one or more image effects may be applied to user captured content. In some implementations, in response to the distribution component making a first image effect available to the first user via a computing platform, the effectuation component may effectuate the first image effect. In some implementations, the effectuation of the first image effect may include using the first image information to generate second image information. The second image information may define a first edited image. The first edited image may comprise the first image effect applied to the first image. The first image effect may be effectuated by editing the first image information to generate the second image information. The edits may be one or more of a modification, changes, enhancement, and/or other edits.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
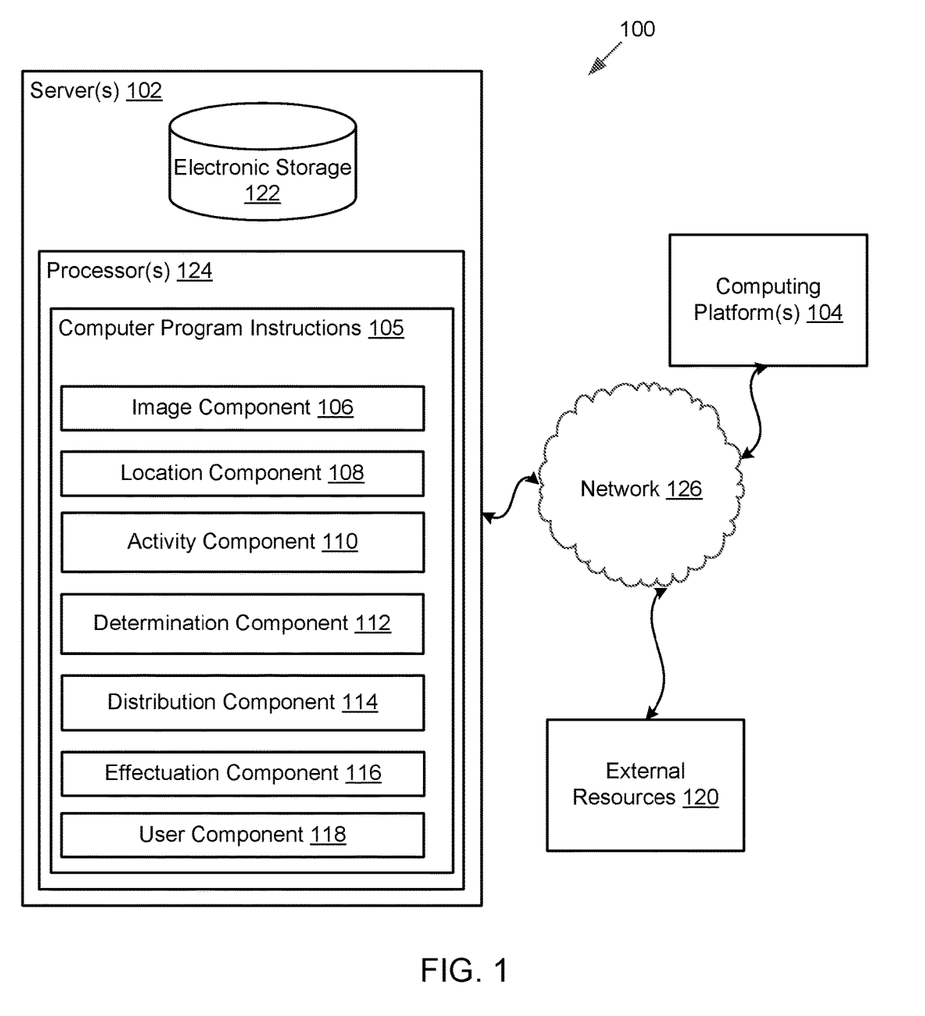
FIG. 1 illustrates a system configured to distribute image effects for user experience events, in accordance with one or more implementations.

FIG. 1 illustrates a system 100 configured to distribute image effects for user experience events, in accordance with one or more implementations. System 100 may include one or more of one or more servers 102, one or more computing platforms 104, external resources 120, a network 126, and/or other components. The user experience event may be making one or more image effect available to users. Criteria may include one or more of location criteria, activity criteria, and/or other criteria.

The one or more servers 102 may include one or more of one or more physical processors 124, non-transitory electronic storage 122, and/or other components. The one or more physical processors 124 may be configured by computer program instructions 105. Executing the computer program instructions 105 may cause the one or more physical processors 124 to facilitate distribution of image effects for user experience events. The computer program instructions 105 may include one or more of an image component 106, location component 108, activity component 110, determination component 112, distribution component 114, effectuation component 116, user component 118, and/or other components.

In some implementations, non-transitory electronic storage 112 may be configured to store user experience event information and/or other information. User experience information may be individual user experience information and/or sets of user experience information. The user experience information may define individual user experience events. The individual sets of user experience information may define criteria for making one or more image effects and/or other effects available to users. The individual user experience events may include making one or more image effects and/or other effects available and/or unavailable to users. Image effects may enhance user interaction with a real world environment. The interaction with the real world environment may be an interaction with some real world activity. The user interaction may be enhanced by the image effects by providing a higher level of engagement, immersion, interaction, achievement, and/or other enhancements between the one or more activities and users.

In some implementations, an interaction with a retailer, a theme park, a festival, and/or other activities may be enhanced by providing user with image effects within a user experience event. The user experience event may have a location and/or activity criteria that may be dovetail with one or more specific activities. For example, providing a user with the image effect of a ghost sticker in the activity of walking through a haunted house theme park may provide a greater level of engagement, immersion, interaction, achievement, and/or other enhancements between the activity and user. In a non-limiting example, the image effects may be one or more of a filter, a sticker, an animation, a text, a video clip, a free form drawing, a sound effect, a soundtrack, and/or other image effects.

In some implementations, activity criteria may be related to one or more activities to be performed. The activity criteria may be one or more of a characteristic, a behavior, an attribute, and/or other elements that may define an activity. A characteristic, behavior, and/or other elements may be components that make up an activity. A characteristic of an activity may include one or more of a rule, a user, a condition, a pacing, a mood, a theme, a quality, and/or other characteristics. A behavior of an activity may include one or more of an form of interaction, a format, a functionality, and/or other behaviors. Components of an activity may include one or more of a time, a set of rule, a limitations, a goal, a location, an interaction, and/or other components that make up an activity.

In a non-limiting example, the activity may include one or more of an encounter with one or more of a real-world entity, reaching a check point, traversing a distance, capturing images, interacting with an entity for a time duration, obtaining item, preforming tasks, and/or other activity. The activity criteria may include one or more of the real-world entity to be encounter, the check point to be reached, the distance to be traversed, the image to be captured, the time duration to interact with the entity, and/or other activity criteria. In a non-limiting example, an activity may be to ride a roller coaster alone for five times. The activity criteria of the activity may be to ride a roller coaster, be alone while riding, and to have ride the roller coaster alone for five times.

In some implementations, location criteria may include one or more locations to be visited. The location criteria may be one or more of a characteristics, and/or other elements that may define a location. The characteristics and/or other elements may be components that make up an location. A characteristic of a location may be one or more of a coordinate and/or set of coordinates in a real world environment, a geographic feature, an associated history, a climate, a population, a mood, a culture, and/or other characteristic of a location.

In a non-limiting example, the location may include one or more of a physical location in a real-world environment, single location and/or a set of locations, an GPS coordinate and/or set of GPS, a landmark, and/or other locations. In a non-limiting example, location criteria may define one or more of a physical location in a real-world environment, single location and/or a set of locations, an GPS coordinate and/or set of GPS, a landmark, signals conveying location information, and/or other location to be visited. The location criteria may be to visit the physical location in a real-world environment, single location and/or a set of locations, an GPS coordinate and/or set of GPS, a landmark, and/or other locations. In a non-limiting example, a location may be the physical location of a roller coaster. The location criteria may be to visit the roller coaster.

By way of non-limiting illustration, a set of user experience information may define a first user experience event. The set of user experience information may define first criteria for making a first image effect and/or other image effects available. The first criteria may include one or more of a first activity criterion, a first location criterion, and/or other criterions. The first activity criterion may related to a first activity to be performed. The first location criterion may relate to a first location to be visited. In some implementations, the first image effect may include one or more audio and/or visual content, and/or other image effects. Visual content may include, for example, specification of pixel colors of an image, and/or other visual content.

In some implementation, image component 106 may be configured to obtain image information, and/or other information. Image information may define user capture content, and/or other content. User captured content may be obtained by one or more computing platforms, non-transitory electronic storage, and/or other storage locations. The user captured content may be one or more of an image, a video, and/or other audio and/or visual content.

In some implementations, a computing platform may include one or more sensors and/or other components. Sensors may be configured to obtain image information and/or other information. Sensors may include one or more of an image sensor, a geo-location sensor, an activity sensor, and/or other sensors. Information obtained by the sensors may be stored in one or more of a non-transitional electronic storage, and/or other storage location.

An image sensor may be configured to generate output signals conveying light and/or electromagnetic radiation incident on the image sensor, and/or other information. In some implementations, the output signals of an image sensor may define image information and/or other information. In some implementations, an image sensor may comprise of one or more of a photo sensor array (e.g., an array of photosites), a charge-coupled device sensor, an active pixel sensor, a complementary metal-oxide semiconductor sensor, an N-type metal-oxide-semiconductor sensor, and/or other image sensors. In a non-limiting example, an image sensor may be included in a camera of a computing platform and/or other devices configured to capture images.

A geo-location sensor may be configured to generate output signals conveying the geo-location of the sensor, and/or other information. In some implementations, the output signal of the geo-location sensor may convey location information and/or other information. The location information may include one or more real-world locations. In some implementations, a geo-location sensor may comprise of one of more of a Global Positioning Systems (GPS), Satellite Navigation Systems (satnav), and/or other positioning systems configured to generate output signals conveying the location of the computing platform, and/or other information. In some implementations, a geo-location sensor may comprise of one or more communication sensors configured to interact with remote wireless devices configured to generate output signals conveying the location of the computing platform, and/or other information. By way of non-limiting example, a wireless device may communicate with one or more electromagnetic signals. The one or more electromagnetic signals may include one or more of a Bluetooth signal, Wi-fi, Li-fi, radio signal, and/or other electromagnetic signals. The communication sensors may generate output signals conveying the location of the computing platform by comparing one or more signal strength between the communication sensor and wireless devices. The one or more comparison of the signal strengths may be used to triangulate the position of the communication sensor relative to the wireless device, and/or other devices.

An activity sensor may be configured to generate output signals conveying the activity associated with the computing platform, and/or other information. In some implementations, the output signals of the activity sensor may convey activity information. In some implementations, an activity sensor may comprise of one or more of a motion sensor, an orientation sensor, an accelerometer, and/or other sensors. The motion sensor may be configured to generate output signals conveying the motion of the computing platform, and/or other information. The orientation sensor may be configured to generate output signals conveying the orientation of the computing platform, and/or other information. The accelerometer may be configured to generate output signals conveying the acceleration of the computing platform, and/or other information. In a non-limiting example, an activity sensor may include one or more of a motion sensor and/or other sensors configured to generate output signals conveying one or more of steps, jumps, a swing of an arm, a punch, a kick, a spin, and/or other actions the user associated with the computing platform may perform.

In some implementations, an individual entity may be one or more of a user, a group of users, a physical object, and/or other entities. A user may be one or more of a person, an animal, and/or other user in a real-world environment. The user may be associated with one or more computing platforms and/or other devices. The physical object may be one or more of a machine, a device and/or other physical objects.

In a non-limiting example, the machine may be one or more of a vehicle, a robot, and/or other machines. The vehicle may be one or more of a car, a bicycle, a wagon, an airplane, a stroller, a scooter, a skateboard, and/or other vehicles. An individual entity may be mobile by virtue of the individual entity traversing across distances in a real-world environment.

In some implementations, an individual entity may be associated with the computing platform by virtue of the entity moving with the computing platforms. By way of non-limiting illustration, an individual entity may be moving with an individual computing platform based on the individual entity holding the individual computing platform. The entity may be holding the computing platform by virtue of the computing platform being attached to the individual entity. By way of non-limiting illustration, a computing platform may be strapped to a user's arm. By way of non-limiting illustration, a computing platform may be attached to a stroller that a user may be pushing.

In some implementations, the location components 108 may be configured to obtain location information and/or other information. In a non-limiting example, location may include a single location and/or sets of locations over time. A location may be one or more of a city, a landmark, a GPS coordinate, and/or other locations. By way of non-limiting example, a landmark may be one or more of a physical location in a real-world environment. By way of non-limiting example, a GPS coordinate may be information that convey a physical location in a real-world environment. By way of non-limiting example, the location component may obtain location information indicating location of the computing platform associated with a first user.

In some implementations, location information may be obtained from individual ones of one or more computing platforms 104, and/or other devices. In some implementations, location component 108 may be configured to obtain sensor output from one or more sensors of one or more computing platforms 104 that convey location information.

In some implementations, location component 108 may be configured to obtain user inputs that convey location information. In a non-limiting example, the user inputs that convey location information may be one or more of a city name, a zip code, a landmark, a GPS coordinate, and/or other user inputs that convey location information. The user input may be obtained from user component 118.

In some implementations, location component 108 may be configured to use machine learning to obtain location information. In a non-limiting example, location component 108 may utilize machine learning techniques and/or other techniques to analyze image information and/or other information from image component 106 and/or other components to obtain location information and/or other information. By way of non-limiting illustration, location component 108 may determine a location of a user based on an image taken by the user that may portray a scene that may be specific to the location. By way of non-limiting illustration, location component 108 may be configured to determine a user may be in Paris based on analysis of an image depicting the Eiffel tower.

In some implementations, location information may include temporal information, and/or other information. The temporal information may convey individual time duration and/or specific time of day of the individual locations and/or sets of locations conveyed by the location information. For example, temporal information and location information may convey that a user may have been at a first location for a first time duration and/or at a first specific time of day. By way of non-limiting illustration, temporal information and location information may convey that a user was at a food court at noon.

In some implementations, machine learning techniques may be configured determine activity information, location information, and/or other information. In a non-limiting example, the determination of the activity information, location information, and/or other information may be based on analyzing one or more image information, output signals generated by sensors, and/or other information. Machine learning techniques may include one or more of a convolution neutral network, decision tree learning, supervised learning, minimax algorithm, unsupervised learning, semi-supervised learning, reinforcement learning, deep learning, and/or other techniques.

In some implementation, temporal information may be obtained in real time and/or near-real time. Temporal information may be obtained by one or more clocks, timers, and/or other time keeping features of a computing platform. In some implementations, the temporal information may be obtained by user input. In a non-limiting example, the user inputs that convey temporal information may be one or more of a time, time-zone, and/or other user input that may convey temporal information. The user input may be obtained from user component 118.

In some implementations, one or more of location component 108, activity component 110, and/or other components may be configured to obtain velocity information. The velocity information may be derived from temporal information, location information, and/or other information. The velocity may be defined by a distance traversed over the time taken to traverse the distance.

In some implementations, one or more of location component 108, activity component 110, and/or other components may be configured to obtain acceleration information. The acceleration information may be derived from velocity information, temporal information, location information, and/or other information. The acceleration may be defined by a change in velocity over the time of the change. The change in velocity may be a difference between a final velocity and an initial velocity. The time of the change may be a difference between a final time and an initial time.

In some implementations, activity component 110 may be configured to obtain activity information and/or other information. Activity may include a single activity and/or sets of activities performed over time. The activity information may convey a single activity and/or sets of activity performed by a user in a real-world environment. In some implementations, activity information may be obtained from computing platform 104, determined by activity component 110, and/or other devices. In a non-limiting example, the activities may be one or more of tasks performed, location visited, items obtained, and/or other activities.

By way of non-limiting example, a task may be one or more of a physical activity performed by a user, a conversation and/or interaction with an entity, and or other tasks. A task may be performed by virtue of the user and/or computing platform preforming the tasks at a point in time. For example, taking a photo, talking to a character, and/or other activities may be a task.

By way of non-limiting example, a location visited may be a physical location in a real-world environment the user and/or computing platform visited in the past and/or present. A user and/or computing platform may visit a location by virtue of the computing platform being located at the location at a point in time. For example, physically walking to a café, a food court, and/or other locations may be considered as visiting a location.

By way of non-limiting example, an item obtained may be transaction performed by a user and/or computing platform with an entity and/or entities. In a non-limiting example, a transaction may be an exchanges in one or more goods and/or services, money, and/or other exchangeable goods between two entities. In some implementations, an item obtained may be one or more physical items, virtual items, and/or other items that may be obtained by a user and/or computing platform. For example, buying a candy bar, taking a food sample, buying a phone application, and/or other activities may be considered as item obtained.

In some implementations, activity components may be configured to obtain sensor output from one or more sensors of one or more computing platform 104 that convey activity information. By way of non-limited example, the sensors may be one or more of an activity sensors and/or other sensors. For example, an output signal of a motion sensor may conveys the activity information of a user jumping.

In some implementations, activity component 110 may be configured to obtain user inputs that convey activity information. By way of non-limiting example, the user input that convey activity information may be one or more of an activity. An example of user input that may convey activity information may be a input that convey a performed task, location visited, items obtained, and/or other user input that may convey activity information. User input may be obtained from user component 118. For example, the input of "ran 10 miles" may indicate that the user preformed the activity of running 10 miles.

In some implementations, there may be one or more of a location information, temporal information, and/or other information associated with the activity information. The location information of the activity information may convey the location where the activity may be performed. The temporal information of the activity information may convey a time duration the activity may be performed.

In some implementations, activity information may be determined from location information, temporal information, velocity information, acceleration information, and/or other information. By way of non-limiting example, the location information may indicate activities that may be performed at a location. For example, the location of a food court may indicate that the user may be performing the activity of purchasing food, eating food, and/or other activities that may be performed at a food court. By way of non-limiting example, the temporal information may indicate activities that may be performed at a time. For example, midnight may indicate that the user may be performing the activity of sleep and/or other activities. By way of non-limiting example, velocity information may indicate activities that may be performed at a given velocity. For example, a user travelling at constant 20 miles per hour may indicate the user is preforming the activity of driving and/or riding in a car and/or other activity that involves a constant velocity. By way of non-limiting example, acceleration information may indicate activities that may be performed at a given acceleration. For example, a user traveling at 9.8 meters per second squared may indicate that a user may be preforming at the activity of free falling on earth and/or other activities. The one of more location information, temporal information, velocity information, acceleration information, and/or other information may be used on combination to determined other activity information.

In some implementations, activity component 108 may be configured to use machine learning to obtain activity information. In a non-limiting example, activity component 110 may utilize machine learning techniques and/or other techniques to analyze location information and/or other information to obtain activity information and/or other information. The obtained activity information may be stored in non-transitory electronic storage 122 and/or other storage locations.

In some implementations, location information and/or activity information may be obtained from one or more devices distributed throughout a real-world environment. The devices may be coupled with sensors. The devices may be configured to generate output signal conveying activity information, location information, and/or other information. A computing platform may obtain the output signals conveying one or more activity information, location information, and/or other information. In some implementations, the device may be the remote wireless devices configured to generate output signals conveying the location of the computing platform, and/or other information as mentioned above in the geo-location sensor section. By way of non-limiting example, the device may be one or more remote motion tracking devices configured to generate output signals conveying activity information. For example, output signal conveying information of a user dancing may convey the activity information of a user preforming the activity of a dance. The devices may be associated with an entity.

In some implementations, an individual entity may be associated with devices by virtue of the individual entity moving with the devices. By way of non-limiting illustration, an individual entity may be moving with devices based on the individual entity holding the individual devices. The entity may be holding the devices by virtue of the devices being attached to the individual entity.

In some implementations, determination component 112 may be configured to determine if criteria of user experience events has been satisfied. By way of a non-limiting example, an individual user experience event including a distribution of an image effect (e.g. ghostly figure sticker) may occur in a location where of an activity may be performed (e.g. a walking through a haunted house theme park). That is, if a user leaves the location where the activity may be performed, the image effect may no longer become available.

In some implementations, determination component 112 may be configured to determine, based on obtained location information, activity information, and/or other information, whether criteria of individual sets of user experience information may be satisfied. The determination component 112 may obtain information stored in one or more of non-transitory electronic storage 122, location component 108, activity component 110, and/or other storage locations. The determination component 112 may determine if the criteria may be satisfied through comparisons between the one or more activity information, location information, and/or other information with the criteria. The determination component 112 may determine if the criteria is satisfied by the computing platform by other methods of determination. Other methods of determination may include one or more cross reference techniques, mathematical deduction, value comparison, cumulative frequency, and/or other methods of determination.

In some implementations, satisfaction of criteria may require satisfaction of individual criterion included in the criteria in an ordered sequence. By way of non-limiting illustration, satisfaction of first criteria may require satisfaction of one or more first activity criterion, first location criterion, and/or other criterion included in the first criteria. In some implementations, satisfaction of the first criterion may include satisfaction of the first activity criterion followed by satisfaction of the first location criterion. In some implementations, satisfaction of the first criteria may include satisfaction of the first location criterion followed by satisfaction of the first activity criterion.

In a non-limiting example, criteria may include a location criterion to visit a haunted house, and a first activity criterion to take a picture in the haunted house. The determination component 112 may obtain location information, activity information, and/or other information to determine if the user visited the haunted house and taken a picture in the haunted house. If the determination component 112 indicates that the user visited the haunted house and taken a picture in the haunted house, then the criteria may be determined to be satisfied. The determination component 112 may be configured to convey results indicating the satisfaction of the criteria. The results may be stored in one or more non-transitory electronic storage and/or other storage locations.

The distribution component 114 may be configured to make one or more image effects available and/or unavailable to one or more computing platforms 104. In some implementations, the distribution component 114 may obtain satisfaction results, based on the criteria satisfied, from the determination component 112, non-transitory electronic storage 122, and/or other storage locations.

In some implementations, responsive to determination of criteria of individual sets of user experience information being satisfied, the distribution component 114 may be configured to make one or more image effects corresponding to satisfied criteria available to one or more computing platforms 104.

In a non-limiting example, responsive to the first activity criterion and/or first location criterion in the first criteria being satisfied, the first image effect may be made available to the first user via an individual computing platform associated with the first user. In some implementations, responsive to criteria for the individual user experience events not being satisfied, the distribution component 114 may make image effects corresponding to the individual user experience events unavailable. In a non-limiting example, responsive to the first criteria not being satisfied, the first image effect may be made unavailable to the first user. By way of non-limiting example, if the determination component 112 determined a user visited the haunted house and taken a picture in the haunted house from the example above, then the distribution component 114 may make the image effect of a ghostly figure available to the computing platform. Image effects may be obtained from one or more non-transitory electronic storage and/or other storage locations.

In some implementations, effectuation component 116 may be configured to effectuate one or more image effects and/or other content. Effectuating one or more image effects may comprise applying one or more image effects to user captured content. In some implementations, the user capture content to which one or more image effect may be applied, may be captured contemporaneously with the one or more image effects being made available. In some implementations, the user capture content to which one or more image effect may be applied, may have been captured previously and selected by a user.

In some implementations, effectuation component 116 may effectuate edited user captured content. The edits of the edited user captured content may be image effects. The edited user captured content may be generated by editing user captured content with image effects. The image effects may correspond to a user selection of the available image effects (e.g., via user component 118). The edited user captured content may include more than one edit.

By way of non-limiting example, the effectuation of the first image effect may use the first image information to generate a second image information. The second image information may define a first edited image. The first edited image being the first image effect applied to the first image. The first image information may be obtained from image component 106 and/or other components. The first image effect may be obtained from non-transitory electronic storage 122 and/or other storage locations. The first image effect may be obtained from user inputs associated with selection of individual image effects made available to the first user, the user input including a first selection by the first user of the first image effect via the computing platform. The second image information may be generated by editing the first image information with a first user selection of a first image effect. The second image information may be an edited first image information with the edit corresponding to the user selection of the first image effect. There may be a third image information generated by editing the second image information with a second user selection of a second image effect. The third image information may be an edited second image information with the edit corresponding to the user selection of the second image effect. The edited images may be stored in one or more of an non-transitory electronic storage and/or other storage locations.

In some implementation, user component 118 may be configured to obtain one or more user inputs. User input may include one or more of an auditory command, a manipulation of a user interface element and/or other types of user input. User input may be obtained from one or more computing platforms and/or other devices. In a non-limiting example, user input may include one or more of selection of available image effects, user identification information, and/or other inputs. Identification information may be one or more of account information and/or other identification information.

Figure 2:
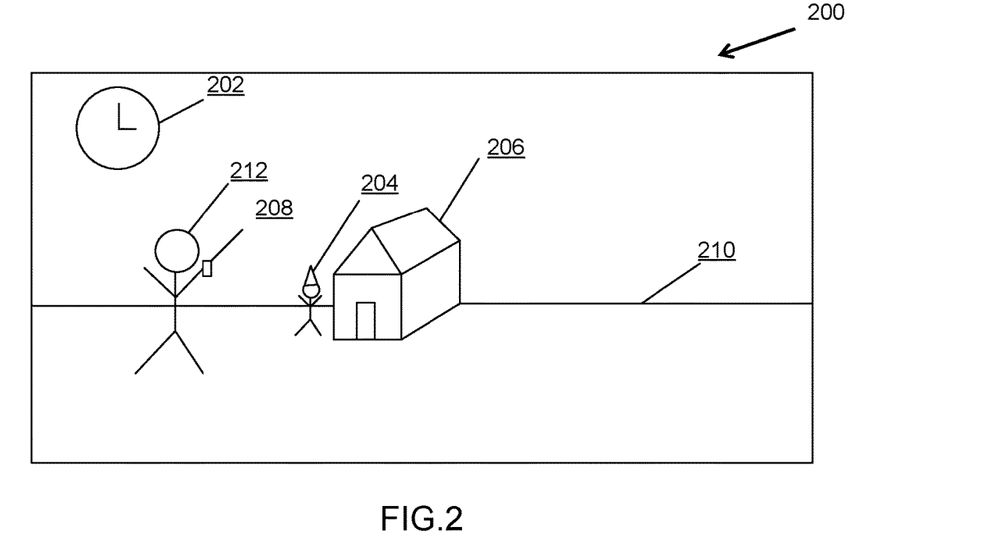
FIG. 2 illustrates an exemplary graphic of an entity associated with a computing platform in a real world environment, in accordance with one or more implementations.

By way of non-limiting illustration, FIG. 2 includes a depiction of a real world environment 200. The depiction of a real world environment 200 includes one or more of a time 202, a user entity 212, a computing platform 208, a non-user entity 204, a location 210, an activity 206, and/or other components. By way of non-limiting illustration, in FIG. 2, the depiction of a real world environment 200 illustrates an entity associated with a computing platform, in accordance with one or more implementations. In the depicted example, FIG. 2 depict an entity 212 associated with a computing platform 208 satisfying some criteria before, after, and/or during capturing content (e.g., images) with a capture device. The capture device may be the computing platform 208. The image information capture by computing platform 208 may correspond to a user captured image 400 (FIG. 4). The computing platform 208 may obtain location information from the GPS coordinate of the real world location 210, temporal information from the time 202, and/or activity information from taking a picture of the house while a non-user entity 204 may be within the frame of the picture (e.g., the activity including being present at the location and taking a picture, for example). By way of non-limiting illustration, an image captured from 208 may be defined by first image information. The first image information may define image 400 without the image effect 408 (FIG. 4). The selection of image effect from 300 (FIG. 3) may cause the image effect 408 to edit the first image information from 208 to generate a second image information 400.

Figure 3:
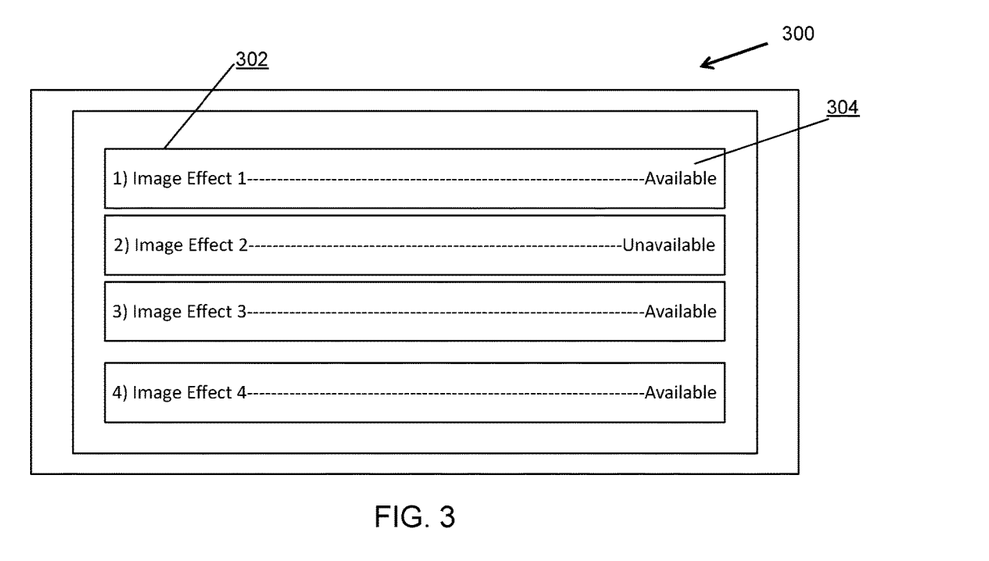
FIG. 3 illustrates a user interface of the computing platform showing one or more image effects made available, in accordance with one or more implementations.
Figure 4:
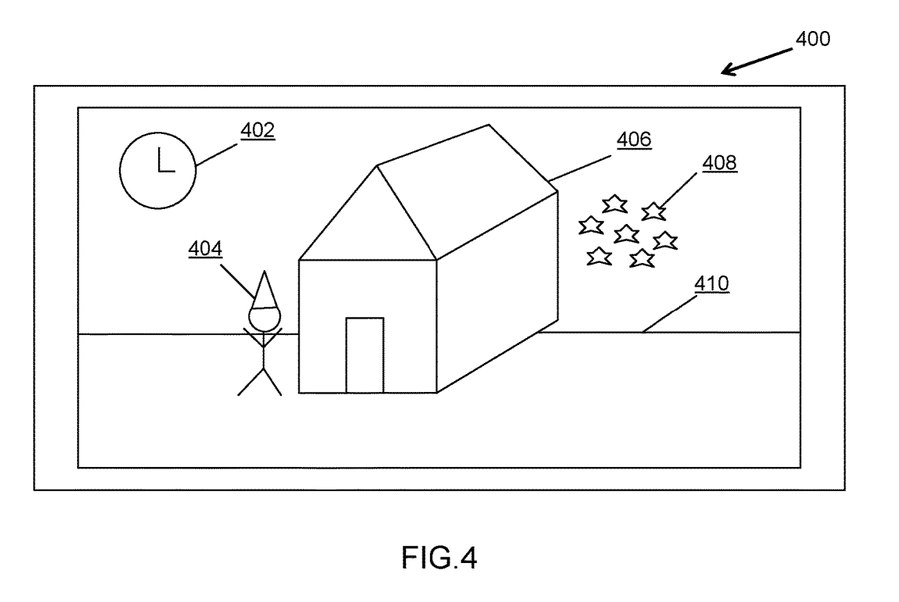
FIG. 4 illustrates a user interface of the computing platform with one or more image effects applied to the user captured image, in accordance with one or more implementations.

By way of non-limiting illustration, FIG. 3 includes a depiction of an implementation of a user interface 300. The depiction of an implementation of a user interface 300 may include one or more of an image effect 302, an indication of the image availability 304, and/or other components. In the depicted example, in response to criteria being satisfied, image effect 302 may be made available and/or unavailable to the computing platform 208 (FIG. 2). The image effect 302 may correspond with image effect 408 (FIG. 4) and/or other image effect. Selection of the image effect 302 may effectuate the image effect 302 on user captured image.

By way of non-limiting illustration, FIG. 4 includes a depiction of an implementation of a user captured image 400 having an image effect 408. The user captured image 400 may correspond to the image information captured by computing platform 208 that may be modified to generate new image information (e.g., defining a second image). The depiction of entity 404 may be the real world entity 204 (FIG. 2). User captured image 400 may depict an example of a second image being generated based on edits from a first selected image effect 302 (FIG. 3).

Returning to FIG. 1, one or more servers 102, computing platform(s) 104, and/or external resources 120 may be operatively linked via one or more electronic communication links. For example, such electronic communication links may be established, at least in part, via a network (e.g., network(s) 126) such as the Internet and/or other networks. It will be appreciated that this is not intended to be limiting and that the scope of this disclosure includes implementations in which one or more servers 102, computing platforms 105, and/or external resources 120 may be operatively linked via some other communication media.

The external resources 120 may include sources of information that are outside of system 100, external entities participating with system 100, and/or other resources. In some implementations, some or all of the functionality attributed herein to external resources 120 may be provided by resources included in system 100.

Server 102 may include one or more non-transitory electronic storage 122, one or more processors 124, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Non-transitory electronic storage 122 may comprise non-transitory electronic storage media that electronically stores information. The non-transitory electronic storage media of the non-transitory electronic storage may include one or both of storage that is provided integrally (i.e., substantially non-removable) with the respective device and/or removable storage that is removably connectable to server 102. Removable storage may include, for example, a port or a drive. A port may include a USB port, a firewire port, and/or other port. A drive may include a disk drive and/or other drive. Non-transitory electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage 122 may include one or more virtual storage resources (e.g., cloud storage, a virtual private network, and/or other virtual storage resources). Non-transitory electronic storage 122 may store files, software algorithms, information determined by processor(s), and/or other information that enables server 102 to function as described herein.

Processor(s) 124 is configured to provide information-processing capabilities in the server 102. As such, processor(s) 124 may include one or more of a digital processor, an analog processor, a digital circuit designed to process information, an analog circuit designed to process information, a state machine, and/or other mechanisms for electronically processing information. Although the processor(s) 124 are shown in FIG. 1 as single entity within the server 102, this is for illustrative purposes only. In some implementations, the processor(s) 124 may include one or more processing units. These processing units may be physically located within the same device or may represent processing functionality of a plurality of devices operating in coordination.

For example, processor(s) 124 may be configured to execute machine-readable instructions 105 including components 106, 108, 110, 112, 114, 116, and/or 118. Processor(s) 124 may be configured to execute components 106, 108, 110, 112, 114, 116, and/or 118 by software; hardware; firmware; some combination of software, hardware, and/or firmware; and/or other mechanisms for configuring processing capabilities on processor(s) 124. It should be appreciated that, although components 106, 108, 110, 112, 114, 116, and/or 118 are illustrated in FIG. 1 as being co-located within a single processing unit, in implementations in which processor 124 includes multiple processing units, one or more of components 106, 108, 110, 112, 114, 116, and/or 118 may be located remotely from the other components. The description of the functionality provided by the different components 106, 108, 110, 112, 114, 116, and/or 118 described above is for illustrative purposes and is not intended to be limiting, as any of components 106, 108, 110, 112, 114, 116, and/or 118 may provide more or less functionality than is described. For example, one or more of components 106, 108, 110, 112, 114, 116, and/or 118 may be eliminated, and some or all of its functionality may be provided by other ones of components 106, 108, 110, 112, 114, 116, 118 and/or other components.

Figure 5:
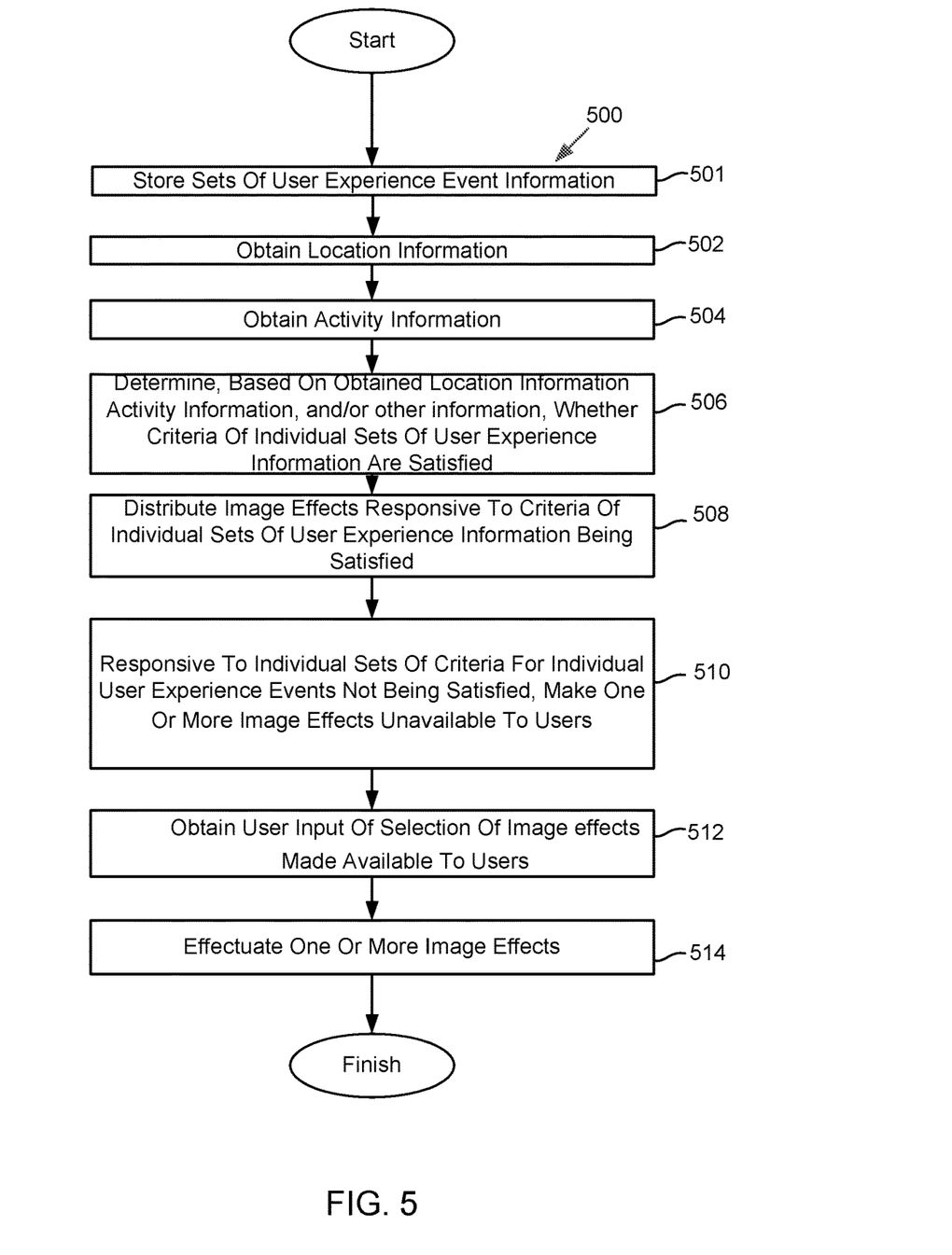
FIG. 5 illustrates a method to distribute image effects for user experience events, in accordance with one or more implementations.

FIG. 5 illustrates an implementation of a method 500 of distributing image effects for user experience events. The operations of method 500 presented below are intended to be illustrative. In some implementations, method 500 may be accomplished with one or more additional operations not described and/or without one or more of the operations discussed. Additionally, the order in which the operations of method 500 are illustrated in FIG. 5 and described below is not intended to be limiting.

In some implementations, method 500 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 500 in response to instructions stored electronically on an non-transitory electronic storage medium. The one or more processing devices may include one or more devices configured through hardware, firmware, and/or software to be specifically designed for execution of one or more of the operations of method 500.

Referring now to method 500 in FIG. 5, at an operation 501, user experience information and/or other information may be stored in one or more non-transitory electronic storage. User experience information may include individual user experience information and/or sets of user experience information. User experience information may define individual user experience events. The individual user experience events may include making one or more image effects and/or other effects available and/or unavailable to users. The individual sets of user experience information may define criteria for making one or more image effects and/or other effects available to users. The user experience information may define first criteria for making a first image effect available. In some implementations, operation 501 may be performed by electronic storage the same or similar to electronic storage 122 (shown in FIG. 1 and described herein).

At an operation 502, location information may be obtained. The location information may indicate location of a computing platform within a real-world environment. A computing platform may be associated with a first user. The location information may indicate a location of the computing platform associated with the first user. In some implementations, operation 502 may be performed by one or more physical processors executing a location component the same as or similar to location component 108 (shown in FIG. 1 and described herein).

At an operation 504, activity information may be obtained. The activity information may convey one or more activities performed by the first user and/or other users. The one or more activities may include a first activity and/or other activities. In some implementations, operation 504 may be performed by one or more physical processors executing an activity component the same as or similar to activity component 110 (shown in FIG. 1 and described herein).

At an operation 506, satisfaction of criteria of the individual sets of user experience information may be determined based on one or more of location information, activity information, and/or other information. In some implementations, operation 506 may be performed by one or more physical processors executing a determination component the same as or similar to determination component 112 (shown in FIG. 1 and described herein).

At an operation 508, image effects may be made available to users responsive to the criteria of the individual sets of user experience information being satisfied. By way of non-limiting illustration, responsive to the first criteria being satisfied, the first image effect may be made available to the first user. In some implementations, operation 508 may be performed by one or more physical processors executing a distribution component and/or an image component the same as or similar to distribution component 114 and/or an image component 106 (shown in FIG. 1 and described herein).

At an operation 510, responsive to the individual sets of criteria for the individual user experience events not being satisfied, one or more image effects corresponding to the individual user experience events may be made unavailable to the users. By way of non-limiting illustration, responsive to the first criteria not being satisfied, the first image effect may be made unavailable to the first user. In some implementations, operation 510 may be performed by one or more physical processors executing a distribution component and/ or an image component the same as or similar to distribution component 114 and/or an image component 106 (shown in FIG. 1 and described herein).

At an operation 512, user input of the selection of image effects made available to users may be obtained. In some implementations, operation 512 may be performed by one or more physical processors executing a user component the same as or similar to user component 118 (shown in FIG. 1 and described herein).

At an operation 514, one or more image effects may be effectuated. In some implementations, operation 512 may be performed by one or more physical processors executing an effectuation component and/or image component the same as or similar to effectuation component 116 and/or image component 106 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

It is claimed:

1. A system configured for distributing image effects for user experience events, the system comprising:

non-transitory electronic storage configured to store sets of user experience event information, the sets of user experience information defining individual user experience events, individual user experience events including making one or more image effects available to users, individual sets of user experience information defining criteria for making one or more image effects available to users, the sets of user experience information including a first set of user experience information, the first set of user experience information defining first criteria for making a first image effect available to users, the first criteria including a first activity criteria and a first location criteria; and one or more physical processors configured by machine-readable instructions to:

obtain location information, the location information indicating location of a computing platform within a real-world environment, the computing platform being associated with a first user;

obtain activity information, the activity information conveying one or more activities performed by the first user, the one or more activities including a first activity;

determine, based on the obtained location information and activity information, whether the criteria of the individual sets of user experience information are satisfied through comparisons of the obtained location information and the first location criteria, and comparison of the obtained activity information and the first activity criteria, respectively;

responsive to the criteria of the individual sets of user experience information being satisfied, make the one or more image effects corresponding to the satisfied criteria available to the users, such that responsive to the first activity criteria and first location criteria included in the first criteria being satisfied, the first image effect is made available to the first user via the computing platform, wherein the first activity criteria includes one or more of an encounter with a real-world entity, reaching a check point, traversing a distance, capturing one or more images, or a passage of time;

responsive to the individual sets of criteria for the individual user experience events not being satisfied, make the one or more image effects corresponding to the individual user experience events unavailable to the users, such that responsive to the first criteria not being satisfied, the first image effect is made unavailable to the first user via the computing platform;

obtain user input associated with selection of individual image effects made available to the first user, the user input including a first selection by the first user of the first image effect via the computing platform;

obtain image information, the image information including first image information defining a first image captured by the computing platform associated with the first user; and effectuate the first image effect using the first image information to generate second image information, the second image information defining a first edited image, the first edited image being the first image effect applied to the first image.

2. The system of claim 1, wherein the first image includes visual content, and wherein the first image information defines the visual content of the first image.

3. The system of claim 1, wherein the one or more image effects include one or more of a filter, a sticker, an animation, text, video clip, a free form drawing, or an audio effect.

4. The system of claim 1, wherein the location criteria includes a single location or a set of locations.

5. The system of claim 1, wherein satisfaction of the first criteria requires satisfaction of the first activity criteria followed by satisfaction of the first location criteria or satisfaction of the first location criteria followed by satisfaction of the first activity criteria.

6. The system of claim 1, wherein the activity information is obtained from the computing platform.

7. The system of claim 1, wherein the activity information is determined from the location information.

8. The system of claim 1, wherein the location information is obtained from the computing platform, the computing platform including one or more sensors configured to generate output signals conveying the location information.

9. A method for distributing image effects of user experience events, the method being implemented in a computer system comprising one or more physical processors and storage media storing machine-readable instructions, the method comprising:

storing sets of user experience event information, the sets of user experience information defining individual user experience events, individual user experience events including making one or more image effects available to users, individual sets of user experience information defining criteria for making one or more image effects available to users, the sets of user experience information including a first set of user experience information, the first set of user experience information defining first criteria for making a first image effect available to users, the first criteria including a first activity criteria and a first location criteria; and obtaining location information, the location information indicating location of a computing platform within a real-world environment, the computing platform being associated with a first user;

obtaining activity information, the activity information conveying one or more activities performed by the first user, the one or more activities including a first activity;

determining, based on the obtained location information and activity information, whether the criteria of the individual sets of user experience information are satisfied through comparisons of the obtained location information and the first location criteria, and comparison of the obtained activity information and the first activity criteria, respectively:

responsive to the criteria of the individual sets of user experience information being satisfied, making the one or more image effects corresponding to the satisfied criteria available to the users, such that responsive to the first activity criteria and first location criteria included in the first criteria being satisfied, the first image effect is made available to the first user via the computing platform, wherein the first activity criteria includes one or more of an encounter with a real-world entity, reaching a check point, traversing a distance, capturing one or more images, or a passage of time;

responsive to the individual sets of criteria for the individual user experience events not being satisfied, making the one or more image effects corresponding to the individual user experience events unavailable to the users, such that responsive to the first criteria not being satisfied, the first image effect is made unavailable to the first user via the computing platform;

obtaining user input associated with selection of individual image effects made available to the first user, the user input including a first selection by the first user of the first image effect via the computing platform;

obtaining image information, the image information including first image information defining a first image captured by the computing platform associated with the first user; and effectuating the first image effect using the first image information to generate second image information, the second image information defining a first edited image, the first edited image being the first image effect applied to the first image.

10. The method of claim 9, wherein the first image includes visual content, and wherein the first image information defines the visual content of the first image.

11. The method of claim 9, wherein the one or more image effects include one or more of a filter, a sticker, an animation, text, video clip, a free form drawing, or an audio effect.

12. The method of claim 9, wherein the location criteria includes a single location or a set of locations.

13. The method of claim 9, wherein satisfaction of the first criteria requires satisfaction of the first activity criteria followed by satisfaction of the first location criteria criterion or satisfaction of the first location criteria followed by satisfaction of the first activity criterion.

14. The method of claim 9, wherein the activity information is obtained from the computing platform.

15. The method of claim 9, wherein the activity information is determined from the location information.

16. The method of claim 9, wherein the location information is obtained from the computing platform, the computing platform including one or more sensors configured to generate output signals conveying the location information.

* * * * *

UNITED STATES PATENT AND TRADEMARK OFFICE
CERTIFICATE OF CORRECTION

PATENT NO. : 10,484,547 B2
APPLICATION NO. : 15/340018
DATED : November 19, 2019
INVENTOR(S) : Kristin Weeks Page 1 of 1

It is certified that error appears in the above-identified patent and that said Letters Patent is hereby corrected as shown below:

In the Claims

In Claim 13, Column 18, Line 52, after "first location criteria", delete "criterion".

In Claim 13, Column 18, Line 54, replace "criterion" with —criteria—.

Signed and Sealed this
Twenty-fifth Day of February, 2020

Andrei Iancu
*Director of the United States Patent and Trademark Office*